March 8, 1955     H. J. STINGER ET AL     2,703,769
METHOD OF MAKING MULTIPLE-GORE BALLOONS
Filed May 9, 1950     2 Sheets-Sheet 1
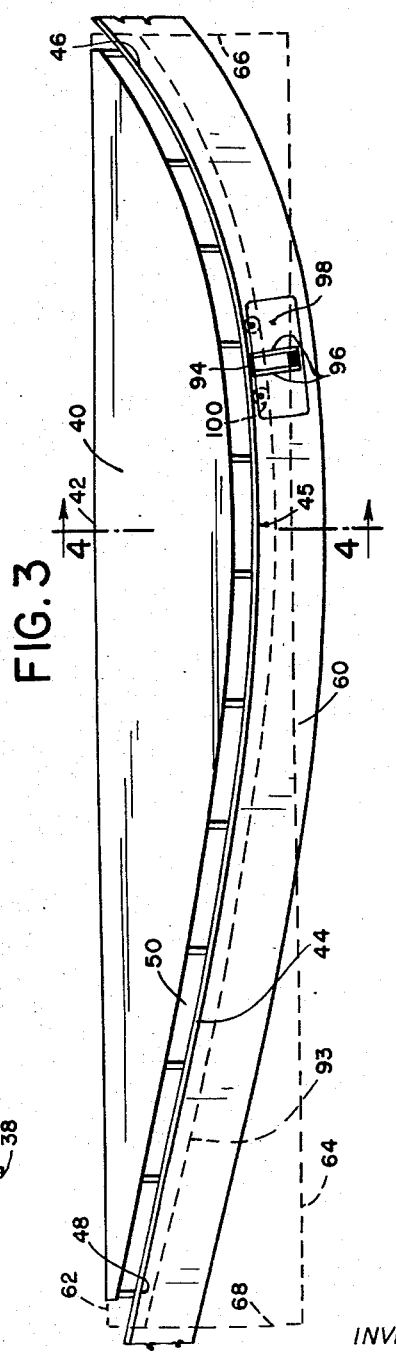
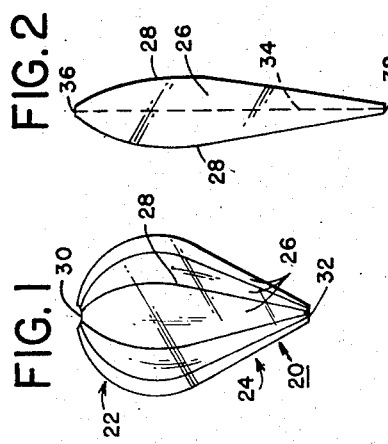
INVENTORS
HENRY J. STINGER
RAYMOND I. HAKOMAKI
WILLIAM F. HUCH
BY *William C. Babcock*
ATTORNEY March 8, 1955 H. J. STINGER ET AL 2,703,769
METHOD OF MAKING MULTIPLE-GORE BALLOONS
Filed May 9, 1950 2 Sheets-Sheet 2
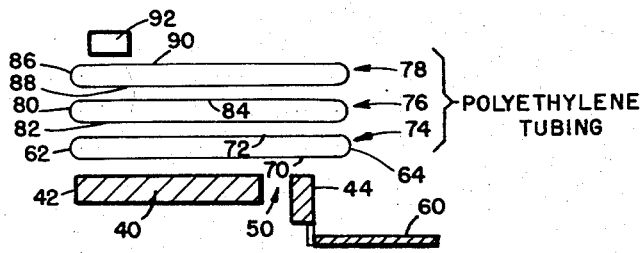
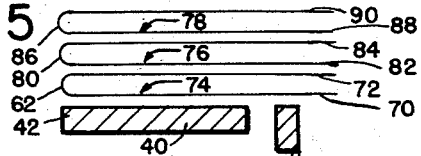
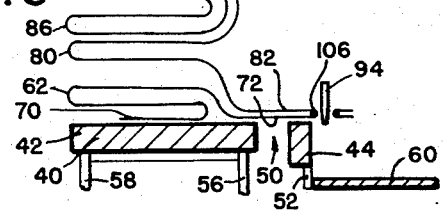
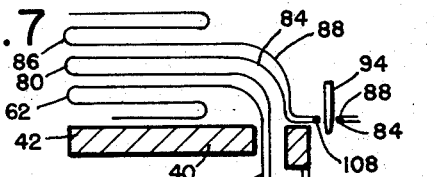
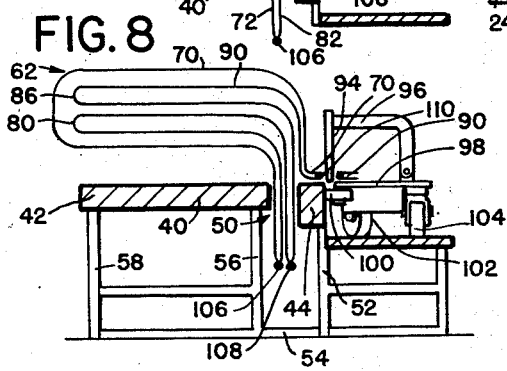
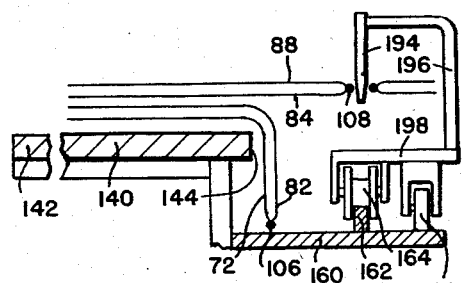
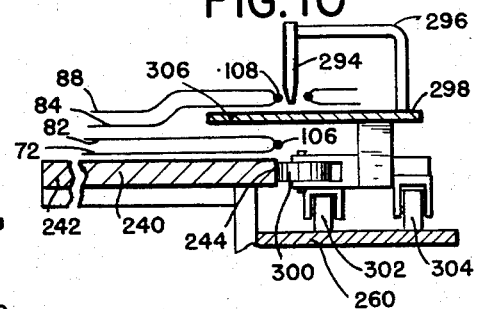
INVENTORS
HENRY J. STINGER
RAYMOND I. HAKOMAKI
WILLIAM F. HUCH
BY William C. Babcock
ATTORNEY United States Patent Office 2,703,769
Patented Mar. 8, 1955

2,703,769

METHOD OF MAKING MULTIPLE-GORE BALLOONS

Henry J. Stinger, Wayzata, Raymond I. Hakomaki, Minneapolis, and William F. Huch, St. Paul, Minn., assignors to General Mills, Inc., a corporation of Delaware Application May 9, 1950, Serial No. 160,973

13 Claims. (Cl. 154—85)

This invention relates to balloons and more particularly to a method and apparatus for manufacturing balloons from tubular material.

Balloons are now known in which the balloon body or bag consists of a plurality of gores or sections of light thermoplastic material which are heat sealed to each other at their adjacent edges in order to form a substantially gas tight enclosure. In such a balloon, it has been customary to make the individual gores of the same size and shape and to cut these gores from a long continuous strip of flat stock, the width of which is slightly greater than the maximum width of the desired gore. It was formerly considered essential that a single layer of flat stock be used in order that the relatively thin thermoplastic material from which the gore was to be cut should be entirely free from folds, creases, or wrinkles which might weaken the resulting gore. Thus it was essential that the two longitudinal edges of a particular gore, which were usually symmetrical with respect to a longitudinal center line of the gore, should be cut individually from the sheet material. When one gore was cut, another layer of material would be placed above the original gore, the gores ordinarily being placed on a table having an edge shaped to correspond to the desired gore pattern, and a second gore would then be cut from the flat sheet. One cut edge of the resulting gore would be heat sealed or welded to the adjacent edge of the other gore. This process would be repeated one gore at a time with one edge of each successive gore being joined to the remaining free edge of the preceding gore, until the desired number of gores had been joined. Thereafter the remaining free edges of the first and last gores would be seamed together to complete the bag or balloon body. In this process, considerable handling and rearrangement of the individual gores were required at each step of the operation. Each time the individual gore sheets were rearranged, it was necessary to align the gore very carefully with the pattern on the table or with the gore to which it was to be joined, in order that the seaming operation could be carried out accurately and without strains on the material.

It is one object of the present invention to provide an improved process for the manufacture of balloon bodies of this general type.

Another object is the provision of a process of balloon manufacture in which a long tubular strip of thermoplastic material may be utilized.

Still another object is the provision of a process in which the necessary handling and rehandling of the gore sections is reduced to a minimum.

A further object is the provision of a balloon manufacturing process in which all of the layers of material for the individual gores may be laid out and aligned in superimposed relation initially without the necessity of substantial handling and realignment as each seam is completed between adjacent gores.

A further object is a process in which tubular or folded thermoplastic material may be utilized, with a folded edge of the material constituting the center line of the resulting individual gores.

Another object is the provision of an improved balloon manufacturing table and welding unit combination which facilitates the carrying out of the improved process of this invention with a minimum of rehandling of the gores.

Another object is the provision of an improved balloon construction table in which provision is made for maintaining the completed gores out of the field of operation of the seaming equipment as later seams are made.

Other objects and advantages will be apparent from the following specification in which certain preferred embodiments of the invention are described.

In the drawings which accompany this specification, and in which like reference characters indicate like parts, Figure 1 is a side elevation of one form of balloon body which can be made with the method and apparatus of this invention.

Fig. 2 is a plan view of an individual gore for construction of the balloon body of Fig. 1.

Fig. 3 is a top view of an improved balloon construction table according to the present invention, with a layer of tubular thermoplastic material shown in phantom outline to indicate its proper position and alignment on the table.

Fig. 4 is a schematic partial sectional view on the line 4—4 of Fig. 3, showing the method of initially laying out the material.

Fig. 5 is a view similar to Fig. 4, showing the material after one edge of the tubular material has been trimmed to correspond roughly to the desired gore shape. This figure also shows the arrangement of the material in the case where flat material folded on itself to give a single folded edge, is utilized initially in lieu of tubular material.

Fig. 6 is a view similar to Fig. 4 showing the initial arrangement of the layers prior to and during the formation of the welded seam between the first two gores.

Fig. 7 is a view similar to Fig. 6 showing the position of the respective layers during formation of the seam between the second and third gores.

Fig. 8 is a similar view showing the arrangement of the layers during formation of the final seam between the free edges of the first and last gores.

Fig. 9 is a view similar to Fig. 7 of an alternate form of apparatus for carrying out the process of this invention, and Fig. 10 is a view similar to Fig. 9 of still another embodiment of the apparatus according to the invention.

As shown in Fig. 1, one form of balloon body or bag which can be made according to this invention consists of a plurality of vertically extending gores joined together at adjacent edges to form a gas tight container body. The particular balloon 20 which is illustrated in Fig. 1 includes a spherical upper section 22 and a tapered or somewhat conical lower section 24. The individual gores 26 extend vertically of the balloon and are ordinarily trimmed or terminated in such a manner at their ends as to leave a small top opening 30 and a bottom opening 32. The top opening 30 can be capped subsequently in known manner, while a suitable load ring can be secured to the lower opening 32. A completed balloon of this type is described and claimed in the copending application of Otto C. Winzen, Serial No. 18,583, filed April 2, 1948, now United States Patent No. 2,526,719, and assigned to the assignee of the present invention. An earlier method of making such a balloon is also described in the copending application of La Mere et al., Serial No. 18,585, filed April 2, 1948, now Patent Number 2,666,006, and also assigned to the same assignee.

In Fig. 2 is shown in plan view one of the individual gores 26 from which the balloon body of Fig. 1 is made. Gore 26 is preferably symmetrical with respect to a longitudinal center line indicated by the dotted line 34. The longitudinal edges 28 of the gore 26 taper from an intermediate portion of maximum width toward the center line at each end of the gore, i. e., at the top 36 and the bottom 38. The top and bottom 36 and 38, respectively, are preferably of finite width rather than tapered to a sharp point in order to provide the top and bottom openings 30 and 32 of the finished balloon body. It will be apparent, however, that many variations in the particular gore shape and in the size and configuration of the resulting balloon body can be achieved within the spirit and scope of the process and apparatus described below.

In Fig. 3, is shown a balloon manufacturing table 40 on which gores of the pattern shown in Fig. 2 can be cut and seamed to each other. Table 40 follows substantially the pattern of a half gore. Thus the table has one straight longitudinal edge 42 which corresponds to the center line 34 of the completed individual gore. The other edge of the table is provided with a guide edge or strip 44 which follows substantially the contour of the desired edge 28 of the completed gore. Thus the guide edge 44 tapers from a point of maximum width at 45 toward the edge 42 of the table at both ends. Thus at one end the portion 46 of guide edge 44 follows the contour of the upper portion of the desired gore edge, while at the opposite end the portion 48 of guide edge 44 follows the desired contour of the lower portion of the gore edge.

According to one feature of the present invention, a balloon construction or gore table 40 is provided with a recess or slotted portion 50 just inside the curved guide edge 44 which corresponds to the outer edge of the finished gore. As shown particularly in Fig. 8, this slotted portion 50 can be provided by mounting the guide strip 44 on a supporting frame 52 which is connected by suitable spacers 54 to the supporting frame members 56 and 58 for the remaining portion of the table 40.

As indicated in the figures, the balloon table 40 is also provided with a downwardly offset platform or table surface 60 located outside of and following the same general path as the guide strip 44 which defines one edge of the finished gore. This platform 60 is carried on the same supporting frame 52 which carries the guide edge 44 and is used to support a welding and seaming apparatus as described below.

According to the method of the present invention, a strip of tubular material is placed longitudinally on the table 40 as shown in phantom outline in Fig. 3. Thus one folded edge 62 of the tubular material is placed in alignment with the straight edge 42 of balloon table 40. The opposite folded edge 64 of the tubular material extends across the opposite edge of the table beyond the guide strip 44. A length of tubular material is used which is great enough to extend from a position 66 at the head end of the table all the way to the point 68 at the opposite end of the desired gore. Thus the folded edge 62 of material will constitute in effect the center line of the first or lowermost gore to be united according to the present process.

As shown schematically in Fig. 4, a plurality of strips of tubular material are placed in superimposed relation and aligned with one edge in registry with the straight edge 42 of the balloon table in the manner just described. The number of strips of tubular material will depend on the number of gores desired in the finished balloon envelope. For simplicity of illustration, the process has been shown in Figs. 4–8, inclusive, with three strips of tubing 74, 76, and 78 in superimposed and aligned relationship. Thus the lower strip of tubing includes lower and upper layers 70 and 72, respectively. The second strip of tubing 76 which will form the second gore of the balloon includes a lower layer 82 and an upper layer 84 of the thermoplastic material. One edge 80 of this folded tubular material is aligned with the folded edge 62 of the lower strip 74 and also with the straight edge 42 of the table to constitute the center line of the second gore.

Similarly, the third strip of tubular gore material 78 has one of its folded edges 86 in alignment with the straight edge 42 of the balloon table 40 in order to constitute the center line of the third gore. This third strip has lower and upper layers 88 and 90 of the thermoplastic material which will ultimately constitute the two halves of the resulting gore.

Once the individual gore strips have been properly superimposed and aligned on the gore table 40, a series of weights 92 may be placed along the edge 42 of the table to hold the gore sections in proper alignment during the remaining steps of the process.

The first step in the conversion of the strips of tubular material into individual gores is illustrated in Fig. 5. In this step, those edges of the tubing at the opposite side of the strip from the straight edge 42 of the table are cut roughly to the pattern of the final gore. This cutting or trimming step follows a path spaced slightly outwardly from the guide edge 44, as indicated by the dotted outline 93 in Fig. 3. While it is possible to lay out all the strips initially and then trim all three tubular sections simultaneously, it is preferred that each strip be trimmed to the condition shown in Fig. 5 as soon as the strip has been positioned and aligned on the table, in order that proper advantage may be taken of the savings accomplished in carrying out the process described in the copending application of Huch et al., Serial No. 160,972, filed May 9, 1950, filed of even date herewith, and assigned to the assignee of the present invention. Thus in the preferred form of the present invention, the first strip of tubular material will be positioned on the pattern or gore table with one folded edge in alignment with the straight edge 42 corresponding to the center line of the final gore. The opposite edge of the tubular strip will then be trimmed roughly to the final gore shape, after which the next strip of tubular material will be positioned and aligned and trimmed in the same manner. Successive strips will be similarly processed until the desired number of sections have been aligned and trimmed to carry the process to the point illustrated in Fig. 5.

According to the next step of the process, which is illustrated in Fig. 6, the cut or free edge of the lowermost layer of the first gore is trucked back out of the way beneath the stack of gores where it will not interfere with the seaming of the successive gore edges. Thus the edge 70 is tucked back as shown in Fig. 6.

At the same time, the free edges of all of the upper layers of material will be folded back above the stack as shown in Fig. 6 in order to leave only the upper layer 72 of the first gore section and the lower layer 82 of the second gore section projecting outwardly over the guide edge 44. These projecting free edges will then be seamed to each other by a welding device indicated generally at 94. The particular welding device may be of any desired form depending on the nature of the thermoplastic material, as long as the device provides a strong and gas proof seam between the free edges of the adjacent gores. For purposes of illustration, a heated element 94 has been shown which consists of an electrically heated resistance wire similar to that described and claimed in the copending Carland application, Serial No. 156,475, filed April 17, 1950, assigned to the same owner as the present invention. Schematic details of such a welding unit are shown in Fig. 8 in which it will be apparent that the heated welding member 94 is carried on supporting arms 96 mounted on the base plate 98 of the welding device. Rollers 100 which are rotatably mounted on vertical axes at one edge of the base plate 98 are designed to engage the guide strip 44 as the welding device moves along the length of the table on the platform portion 60. One or more supporting or drive rollers 102 and 104 engage the table surface 60 to support the base plate 98 and provide for relative movement of the welding device along the table.

Since the particular details of the welding unit do not form a part of the invention, the apparatus will not be further described other than to point out that movement of the heated welding member 94 along a path corresponding to the edge of the guide strip 44 will sever the free edges of the thermoplastic material along a similar line and will form a seam or bead of melted thermoplastic material as indicated at 106 in Fig. 6 between the respective layers. Any seaming equipment which will produce a seam of the desired strength and resistance to diffusion can be utilized in the process and apparatus of the invention.

Thus, as shown in Fig. 6, the welding member 94 will be moved the length of the table along the guide strip 44 to form a seam 106 between the free edges of layers 72 and 82. Thereafter, these seamed edges and their completed seam 106 will be tucked through the slot 50 so that the seamed edge 106 of layers 72 and 82 hangs downwardly through the slot and is thus located inwardly of the guide strip 44 and out of the way of the next seaming operation. At this time the next pair of free edges to be joined, namely the layers 84 and 88, will be folded down so as to extend over the guide strip 44. The seaming operation with welding member 94 will then be repeated to form a further seam 108 between the remaining free edge of the second gore and the first free edge of the third gore. This step of the process is completely illustrated in Fig. 7.

The final steps of the process are shown in Fig. 8. As shown in this figure, the second completed seam 108 is also tucked downwardly through slot 50 where it will be out of the way of the final seaming operation.

In this final step, the free edge of the first or bottommost layer 70 of the initial gore is pulled out from under the stack of gores at the side corresponding to the straight edge 42 of the table and is carried up around the stack so that the initial folded edge 62 is in effect reversed, but it still aligned with the straight table edge 42. The layer 70 will accordingly become the topmost layer of the stack and will be superimposed above the uppermost layer 90 of the top or last gore. Thus the free edges of the layers 70 and 90 will project across the guide edge 44 of the table for the formation of the final seam. Movement of the welding member 94 along the guide strip 44 will accordingly result in the formation of the final seam 110 between the free edges of layers 70 and 90.

As indicated above, only three gores or strips of tubular material have been illustrated for simplicity and convenience. It will be apparent, however, that selection of the proper number of gores will merely require repetition of the intermediate step illustrated in Fig. 7 until a balloon envelope of the desired shape is obtained. The method can accordingly be utilized for the production of a completed balloon body or envelope of the type shown in Figure 1.

An important feature of the process is the fact that the layers of tubular material, when once aligned in superimposed relation, are not substantially disturbed and do not require substantial realignment throughout the intermediate steps of the process. The only times the material has to be handled to any extent are during its initial alignment, and during the rearrangement of the bottommost layer, in preparation for formation of the final seam.

As pointed out above, the process can only be used with thermoplastic sheet material which is not weakened or cracked at its folded edges, inasmuch as one of these folded edges is utilized as the center line of the completed gore. Tubular thermoplastic material is ordinarily supplied in relatively large rolls, so that the folded edges of the tubular strip are substantially creased during storage. After such creasing and storage, many types of thermoplastic material would be cracked or weakened to an extent which would make the material unsuitable for use in the present process. Polyethylene tubing, however, has been found to possess extremely high resistance to flexing and creasing. Such material, when processed according to the present invention, shows no substantial weakness or permeability at the center lines of the individual gores where the material was folded or creased during storage on its supply roll. Consequently the process of the present invention is particularly adapted to the construction of balloons from tubular polyethylene material.

As suggested above, it might be possible to utilize material in the present process which has only one folded edge between its upper and lower layers. In such a case, the process could be started by superimposing the folded edges of the respective strips above the proposed center line of the desired gores as illustrated in Fig. 5, and then continuing the described process from that point. To date, however, thermoplastic material of the type suitable for balloon manufacture has not been supplied in folded form corresponding to the layers illustrated in Fig. 5. The problem of starting with flat sheet material of double this width, and folding it to the form shown in Fig. 5, is believed to involve additional labor. Therefore the preferred form of the present process utilizes tubular material of the type shown initially in Fig. 4, although it should be remembered that the process can be used advantageously whenever material is readily available initially in the form shown in Fig. 5.

An alternate form of apparatus for carrying out the present invention is illustrated in Fig. 9. This apparatus includes a balloon table 140 similar to the table 40 of the previous embodiment. One edge 142 of the table is straight and corresponds to the center line of the desired final gore. The other edge 144 follows the contour of the outer edge of the gore but is spaced inwardly somewhat from the exact location of the gore contour. In other words, the total width of the table from edge 142 to edge 144 is slightly less than half the width of the desired gore. In this table a platform 160 is provided for the welding unit and this platform 160 carries a guide rail 162 parallel to the contour of edge 144. A notched supporting roller 164 is provided on the welding unit to guide the unit in the desired path. The welding unit includes a heated member 194 carried by supporting arms 196 on a suitable base 198. The guide roller 164 as well as additional supporting rollers 166 are rotatably mounted on the base 198. Movement of the welding device along the rail 162 will accordingly result in movement of the welding member 194 along a path parallel to the guide edge 144. The path of welding member 194 corresponds exactly to the contour of the outer gore edge. Since this path is spaced outwardly from the edge 144 of the gore table, a space will be provided in which the layers of material which are first seamed to each other can hang downwardly out of the way of the welding operation which is applied to subsequent layers. The process steps previously described will be equally applicable in connection with the apparatus of Fig. 9.

Similarly, in Fig. 10, another embodiment of the apparatus is shown. Here, the gore table 240 has a straight edge 242 corresponding to the center line of the gore and a curved edge 244 corresponding to the contour of the outer edge of the gore. The welding member 294 is carried by arms 296 on a platform 298 on which are mounted guide rollers 300 to engage the edge 244 of the table, as well as supporting rollers 302 and 304 to carry the welding unit along the platform 260. In this case the base plate 298 of the welding unit extends inwardly above the table edge 244 and is spaced above the top of the table portion 240 a distance sufficient to accommodate all of the welded layers of thin thermoplastic sheet material. Thus the layers 72 and 82 and the welded seam 106 which has previously been formed may rest directly on the top of table 240 as shown in Fig. 10, while the next two layers 84 and 88 are supported on the platform 306 of the welding apparatus during the seaming operation. With the apparatus of Fig. 10, the steps of the welding process previously described are again carried out in the same general manner and order.

The preferred form of the process described in connection with Figs. 4 to 8 involves the initial laying out on the balloon table of enough strips to form all the desired gores of the final balloon. Thus all the folded edges corresponding to the gore centerlines are aligned initially with the straight edge of the table, and this alignment is maintained throughout the successive intermediate seaming steps.

According to an alternate form of the invention, it is possible to alternate the steps of laying out and sealing the strips. Thus the first two tubular strips would be laid out and aligned as indicated. After seaming the upper layer of the bottom strip to the lower layer of the second strip, the operator would then lay out a third strip. After proper alignment of this third strip, its lower layer would be seamed to the upper layer of the second strip. These steps would be continued with alternate laying out and sealing operations until the desired number of gores have been united.

According to the foregoing specification, a method and apparatus for balloon construction have been described which accomplish the objects set forth at the beginning of the application and which make possible more economical production of balloon bodies of thermoplastic material.

Since minor variations and changes in the exact details of construction will be apparent to persons skilled in this field, it is intended that this invention shall cover all such changes and modifications as fall within the spirit and scope of the attached claims.

We claim as our invention:

1. The method of forming multiple-gore balloons from double sheet material having two layers and at least one integral folded edge which comprises superimposing a plurality of strips of the material corresponding to the number of desired gores, with one folded edge of each strip aligned with the corresponding folded edge of each other strip to constitute the center line of each gore, trimming the opposite edge of each strip to the shape of the desired gore, seaming the trimmed edge of the upper layer of the bottom strip to the trimmed edge of the lower layer of the next strip, successively seaming the trimmed edge of the upper layer of each strip to the trimmed edge of the lower layer of the next higher strip, maintaining the alignment of said folded edges throughout said successive seaming steps, and then seaming the trimmed edge of the lower layer of the bottom strip to the trimmed edge of the upper layer of the topmost strip.

2. The method according to claim 1 in which said material is tubular material having a second integral folded edge opposite said one folded edge, said trimming step separating said second integral folded edge and thereby facilitating said successive seaming steps.

3. The method of forming multiple-gore balloons from double sheet material having upper and lower layers connected by at least one integral folded edge which comprises superimposing a plurality of strips of the double material corresponding to the number of desired gores, with said one integral folded edge of each strip aligned with the corresponding folded edge of each other strip to constitute the center line of the desired gore shape, successively seaming the remaining edge of the upper layer of each strip to the remaining edge of the lower layer of the next higher strip along a path corresponding to the edge of the desired gore shape, and maintaining the alignment of said folded edges throughout said successive seaming steps.

4. The method of forming multiple-gore balloons from doubled sheet material having upper and lower layers connected by at least one integral folded edge which comprises superimposing a plurality of strips of the doubled material corresponding to the number of desired gores, with said one integral folded edge of each strip aligned with the corresponding folded edge of each other strip to constitute the center line of the desired gore shape, successively seaming the remaining edge of the upper layer of each strip to the remaining edge of the lower layer of the next higher strip along a path corresponding to the edge of the desired gore shape, maintaining the alignment of said folded edges throughout said successive seaming steps, withdrawing the remaining edge of the lower layer of the lowermost strip from beneath the superimposed strips at the side defined by the aligned folded edges, and drawing said lower layer upwardly around the folded edges and into superimposed position above the upper layer of the topmost strip, and finally seaming said remaining edge of what was originally the lower layer of the lowermost strip to the remaining edge of what was originally the upper layer of the uppermost strip.

5. The method of forming multiple-gore balloons from tubular sheet material having upper and lower layers joined by integral folded edges which comprises superimposing a plurality of strips of the tubular material corresponding to the number of desired gores, with one folded edge of each strip aligned with the corresponding folded edge of each other strip along the center line of the desired gore shape, cutting off the remaining folded edge of each strip along a path corresponding at least roughly to the desired gore edge shape with respect to said center line, successively seaming the cut edge of the upper layer of each strip to the cut edge of the lower layer of the next higher strip along a path corresponding exactly to the desired gore edge shape, and maintaining the alignment of said folded edges throughout said successive seaming steps.

6. The method of forming multiple-gore balloons from doubled sheet material having upper and lower layers connected by at least one integral folded edge which comprises superimposing a plurality of strips of the doubled material corresponding to the number of desired gores, with one folded edge of each strip aligned with the corresponding folded edge of each other strip along the center line of the desired gore shape, cutting the remaining edge of each layer of each strip along a path corresponding at least roughly to the desired gore edge shape, folding the cut edges of all layers higher than the lower layer of the next-to-the bottom strip back on top of the superimposed strips toward the aligned folded edges, seaming the cut edge of the upper layer of the bottom strip to the cut edge of the lower layer of the next-to-the bottom strip along a path corresponding exactly to the desired gore edge shape, successively seaming together the cut edges of each pair of next higher adjacent layers along said last-mentioned path, and maintaining said folded edges in their initial alignment throughout the aforesaid seaming steps.

7. The method of forming multiple-gore balloons from doubled sheet material having upper and lower layers connected by at least one integral folded edge which comprises superimposing a plurality of strips of the doubled material corresponding to the number of desired gores, with one folded edge of each strip aligned with the corresponding folded edge of each other strip along the center line of the desired gore shape, cutting the remaining edge of each layer of each strip along a path corresponding at least roughly to the desired gore edge shape, folding the cut edge of the lower layer of the bottom strip back beneath the superimposed strips, folding the cut edges of all layers higher than the lower layer of the next-to-the bottom strip back on top of the superimposed strips toward the aligned folded edges, seaming the cut edge of the upper layer of the bottom strip to the cut edge of the lower layer of the next-to-the bottom strip along a path corresponding exactly to the desired gore edge shape, successively seaming together the cut edges of each pair of next higher adjacent layers along said last-mentioned path, and maintaining said folded edges in their initial alignment throughout the aforesaid seaming steps.

8. The method of forming multiple-gore balloons from doubled sheet material having upper and lower layers connected by at least one integral folded edge which comprises superimposing a plurality of strips of the doubled material corresponding to the number of desired gores, with one folded edge of each strip aligned with the corresponding folded edge of each other strip along the center line of the desired gore shape, cutting the remaining edge of each layer of each strip along a path corresponding at least roughly to the desired gore edge shape, folding the cut edge of the lower layer of the bottom strip back beneath the superimposed strips, folding the cut edges of all layers higher than the lower layer of the next-to-the botom strip back on top of the superimposed strips toward the aligned folded edges, seaming the cut edge of the upper layer of the bottom strip to the cut edge of the lower layer of the next-to-the bottom strip along a path corresponding exactly to the desired gore edge shape, successively seaming together the cut edges of each pair of next higher adjacent layers along said last-mentioned path, maintaining said folded edges in their initial alignment throughout the aforesaid seaming steps, and then pulling the folded-back and cut edge of the lowermost layer out from under the superimposed strips at the side defined by the aligned folded edges and up and over the strips and into registry with the cut edge of the upper layer of the uppermost strip, and finally seaming together said last mentioned cut edges along said last mentioned path.

9. The method of forming balloon gores from doubled sheet material having upper and lower layers connected by at least one integral folded edge which comprises aligning said one folded edge to constitute the center line of the desired gore, and simultaneously cutting the remaining edge of both the upper and lower layers along a path corresponding at least roughly to the desired gore edge shape.

10. The method of claim 9 in which the doubled sheet material is polyethylene having an individual layer thickness between .0005 and .003 inches.

11. The method of making multiple-gore balloons from doubled thermoplastic sheet material having upper and lower layers connected by at least one integral folded edge, which comprises superimposing first and second strips of the material with one folded edge of each strip aligned with the corresponding folded edge of the other strip to constitute the centerline of each gore, seaming the remaining edge of the upper layer of the bottom strip to the remaining edge of the lower layer of the second strip, thereafter laying out a third strip in similar superimposed relation and alignment with the first strips, similarly seaming the lower layer of the third strip to the upper layer of the second strip, and repeating said laying out step and said seaming step in alternate succession until the desired number of gores have been joined.

12. The method of making multiple-gore balloons from doubled sheet material having upper and lower layers connected by at least one integral folded edge which comprises superimposing a plurality of strips of the material with said one integral folded edge of each strip aligned with the corresponding edge of each other strip along the center line of the desired gore shape, cutting off the remaining folded edge of both the upper and lower layers of each strip along a path corresponding at least roughly to the desired gore edge shape with respect to said center line, and seaming the cut edge of the upper layer of each strip to the cut edge of the lower layer of the next higher strip along a path corresponding exactly to the desired gore edge shape.

13. The method according to claim 12 in which said material is tubular sheet material and in which said remaining folded edge of each strip is cut off before the next higher strip is superimposed.

References Cited in the file of this patent

UNITED STATES PATENTS

| | | |
|---|---|---|
| 1,081,792 | Vaniman | Dec. 16, 1913 |
| 1,607,885 | Fenton | Nov. 23, 1926 |
| 1,820,124 | Dorogi | Aug. 25, 1931 |
| 1,974,203 | Collins | Sept. 18, 1934 |
| 2,341,399 | Timblin | Feb. 8, 1944 |
| 2,407,495 | High et al. | Sept. 10, 1946 |
| 2,503,984 | Wuko | Apr. 11, 1950 |
| 2,522,079 | Winstead | Sept. 12, 1950 |
| 2,526,719 | Winzen | Oct. 24, 1950 |